(12) United States Patent
Topol

(10) Patent No.: US 10,371,168 B2
(45) Date of Patent: Aug. 6, 2019

(54) MODAL NOISE REDUCTION FOR GAS TURBINE ENGINE

(71) Applicant: UNITED TECHNOLOGIES CORPORATION, Hartford, CT (US)

(72) Inventor: David A. Topol, West Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 1161 days.

(21) Appl. No.: 14/680,409

(22) Filed: Apr. 7, 2015

(65) Prior Publication Data

US 2016/0298651 A1 Oct. 13, 2016

(51) Int. Cl.
| | |
|---|---|
| *F01D 25/04* | (2006.01) |
| *F04D 29/66* | (2006.01) |
| *F01D 5/02* | (2006.01) |
| *F01D 5/12* | (2006.01) |
| *F01D 9/04* | (2006.01) |
| *F04D 29/32* | (2006.01) |
| *F01D 5/26* | (2006.01) |
| *F04D 29/54* | (2006.01) |

(52) U.S. Cl.
CPC ............ *F04D 29/661* (2013.01); *F01D 5/02* (2013.01); *F01D 5/12* (2013.01); *F01D 5/26* (2013.01); *F01D 9/041* (2013.01); *F01D 25/04* (2013.01); *F04D 29/324* (2013.01); *F04D 29/544* (2013.01); *F04D 29/663* (2013.01); *F04D 29/666* (2013.01); *F05D 2260/96* (2013.01)

(58) Field of Classification Search
None
See application file for complete search history.

(56) References Cited

U.S. PATENT DOCUMENTS

| | | | |
|---|---|---|---|
| 5,692,702 A | 12/1997 | Andersson | |
| 7,806,651 B2* | 10/2010 | Kennepohl | ............... F01D 5/10 415/119 |
| 7,891,943 B2 | 2/2011 | Tsuchiya et al. | |
| 8,246,292 B1* | 8/2012 | Morin | ..................... F02C 3/107 415/1 |
| 8,534,991 B2 | 9/2013 | Topol | |

(Continued)

FOREIGN PATENT DOCUMENTS

| | | |
|---|---|---|
| WO | WO9603585 | 2/1996 |
| WO | 2005100750 A1 | 10/2005 |

OTHER PUBLICATIONS

European Search Report for European Application No. 16164202.0 dated Oct. 19, 2016.

(Continued)

*Primary Examiner* — Logan Kraft
*Assistant Examiner* — Jason Fountain
(74) *Attorney, Agent, or Firm* — Carlson, Gaskey & Olds, P.C.

(57) ABSTRACT

An exemplary section of a gas turbine engine according to this disclosure includes, among other things, a first array of airfoils including a first number of airfoils, and a second array of airfoils downstream of the first array of airfoils. The second array includes a second number of airfoils. The second number of airfoils is at least 1.19 times the first number of airfoils thereby providing a predetermined modal.

19 Claims, 4 Drawing Sheets

(56) References Cited

U.S. PATENT DOCUMENTS

| | | |
|---|---|---|
| 2011/0123342 A1 | 5/2011 | Topol |
| 2012/0117975 A1 | 5/2012 | Sharma et al. |
| 2013/0040545 A1* | 2/2013 | Finney .................. B64D 13/06 454/71 |
| 2013/0219922 A1 | 8/2013 | Gilson et al. |
| 2014/0271112 A1 | 9/2014 | Morin et al. |

OTHER PUBLICATIONS

Ulf Michel, Aircraft Noise Reduction by Technical Innovations, 19th AIAA/CEAS Aeroacoustics Conference 2013.

Nick C. Ovenden, Cut-on cut-off transition in flow ducts: comparing multiple-scales and finite-element solutions, American Institute of Aeronautics and Astronautics.

Sawyer, S. and Fleeter, S., "Source Control of Turbomachine Descrete-Frequency Tone Generation" (1996). International Compressor Engineering Conference. Paper 1198. Http://docs.lib.purdue.edu/icec/1198.

\* cited by examiner

MODAL NOISE REDUCTION FOR GAS TURBINE ENGINE

BACKGROUND

A gas turbine engine typically includes a fan section, a compressor section, a combustor section, and a turbine section. The compressor section compresses air and delivers it into a combustion chamber. The compressed air is mixed with fuel and combusted in the combustion section. Products of this combustion pass downstream over turbine rotors. The compressor is typically provided with rotating blades, and stator vanes adjacent to the blades. The stator vanes control the flow of the air to blades. The arrangement between the stator vanes and the blades has an influence on the amount of noise (e.g., sound) generated by the engine.

SUMMARY

An exemplary section of a gas turbine engine according to this disclosure includes, among other things, a first array of airfoils including a first number of airfoils, and a second array of airfoils downstream of the first array of airfoils. The second array includes a second number of airfoils. The second number of airfoils is at least 1.19 times the first number of airfoils thereby providing a predetermined modal response.

In a further non-limiting embodiment of the foregoing section, the second number of airfoils is within a range between 1.19 and 1.55 times the first number of airfoils.

In a further non-limiting embodiment of the foregoing section, the range is defined by the following equation $$1 + \frac{M_{tip}\sin\theta}{1-M};$$

where $M_{tip}$ is a tip rotational Mach number, M is the Mach number into the second array from a frame of reference of the second array, and θ is a stagger angle of the second array.

In a further non-limiting embodiment of the foregoing section, the stagger angle is the incline of a chord between a leading edge and a trailing edge of an airfoil relative to a direction parallel to an engine central longitudinal axis.

In a further non-limiting embodiment of the foregoing section, the range is further defined by:

$$\frac{n}{k}\left(1 + \frac{M_{tip}\sin\theta}{1-M}\right)$$

when the upstream array is a rotor and the downstream array is a stator;

$$\frac{k}{n}\left(1 + \frac{M_{tip}\sin\theta}{1-M}\right)$$

when the upstream array is a stator and the downstream array is a rotor;
where n is the harmonic of blade passing frequency, and k is the harmonic of vane passing frequency.

In a further non-limiting embodiment of the foregoing section, n and k are equal to 1.

In a further non-limiting embodiment of the foregoing section, the section includes a plurality of arrays of airfoils, and a number of airfoils in each array is at least 1.19 times a number of airfoils in an immediately upstream array.

In a further non-limiting embodiment of the foregoing section, the number of airfoils in each array is within a range between 1.19 and 1.55 times the number of airfoils in the immediately upstream array.

In a further non-limiting embodiment of the foregoing section, the first array of airfoils is an array of stator vanes, and wherein the second array of airfoils is an array of rotor blades.

In a further non-limiting embodiment of the foregoing section, the section is a low pressure compressor.

A gas turbine engine according to an exemplary aspect of the present disclosure includes, among other things, a low pressure compressor including a first array of airfoils and a second array of airfoils downstream of the first array. The first array includes a first number of airfoils and the second array includes a second number of airfoils. The second number of airfoils is at least 1.19 times the first number of airfoils thereby providing a predetermined modal.

In a further non-limiting embodiment of the foregoing engine, the second number of airfoils is within a range between 1.19 and 1.55 times the first number of airfoils.

In a further non-limiting embodiment of the foregoing engine, the range is defined by the following equation $$1 + \frac{M_{tip}\sin\theta}{1-M};$$

where $M_{tip}$ is a tip rotational Mach number, M is the Mach number into the second array from a frame of reference of the second array, and θ is a stagger angle of the second array.

In a further non-limiting embodiment of the foregoing engine, the stagger angle is the incline of a chord between a leading edge and a trailing edge of an airfoil relative to a direction parallel to an engine central longitudinal axis.

In a further non-limiting embodiment of the foregoing engine, the range is further defined by:

$$\frac{n}{k}\left(1 + \frac{M_{tip}\sin\theta}{1-M}\right)$$

when the upstream array is a rotor and the downstream array is a stator;

$$\frac{k}{n}\left(1 + \frac{M_{tip}\sin\theta}{1-M}\right)$$

when the upstream array is a stator and the downstream array is a rotor;
where n is the harmonic of blade passing frequency, and k is the harmonic of vane passing frequency.

In a further non-limiting embodiment of the foregoing engine, n and k are equal to 1.

A method according to an exemplary aspect of this disclosure includes, among other things, controlling an interaction between a first array of airfoils and a second arrays of airfoils during operation of a gas turbine engine by providing a number of airfoils in the second array that is at least 1.19 times the number of airfoils in the first array. The second array of airfoils is downstream of the first array of airfoils.

In a further non-limiting embodiment of the foregoing method, the number of airfoils in the second array is within a range between 1.19 and 1.55 times the number of airfoils in the first array.

In a further non-limiting embodiment of the foregoing method, the range is defined by the following equation $$1 + \frac{M_{tip}\sin\theta}{1-M};$$

where $M_{tip}$ is a tip rotational Mach number, M is the Mach number into the second array from a frame of reference of the second array, and $\theta$ is a stagger angle of the second array.

In a further non-limiting embodiment of the foregoing method, the range is further defined by:

$$\frac{n}{k}\left(1 + \frac{M_{tip}\sin\theta}{1-M}\right)$$

when the upstream array is a rotor and the downstream array is a stator;

$$\frac{k}{n}\left(1 + \frac{M_{tip}\sin\theta}{1-M}\right)$$

when the upstream array is a stator and the downstream array is a rotor;
where n is the harmonic of blade passing frequency, and k is the harmonic of vane passing frequency.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows.

DETAILED DESCRIPTION

Figure 1:
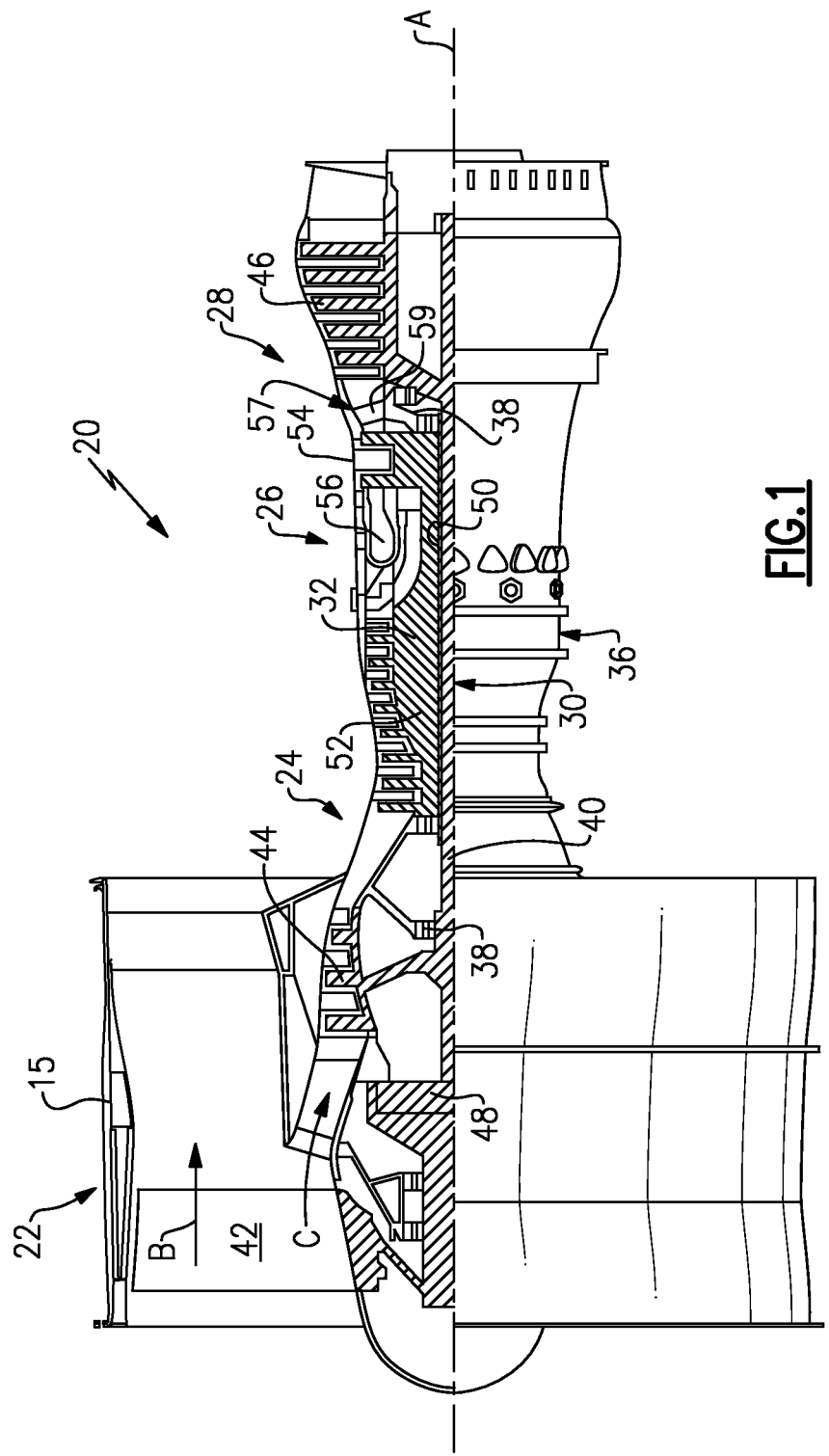
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

Figure 2:
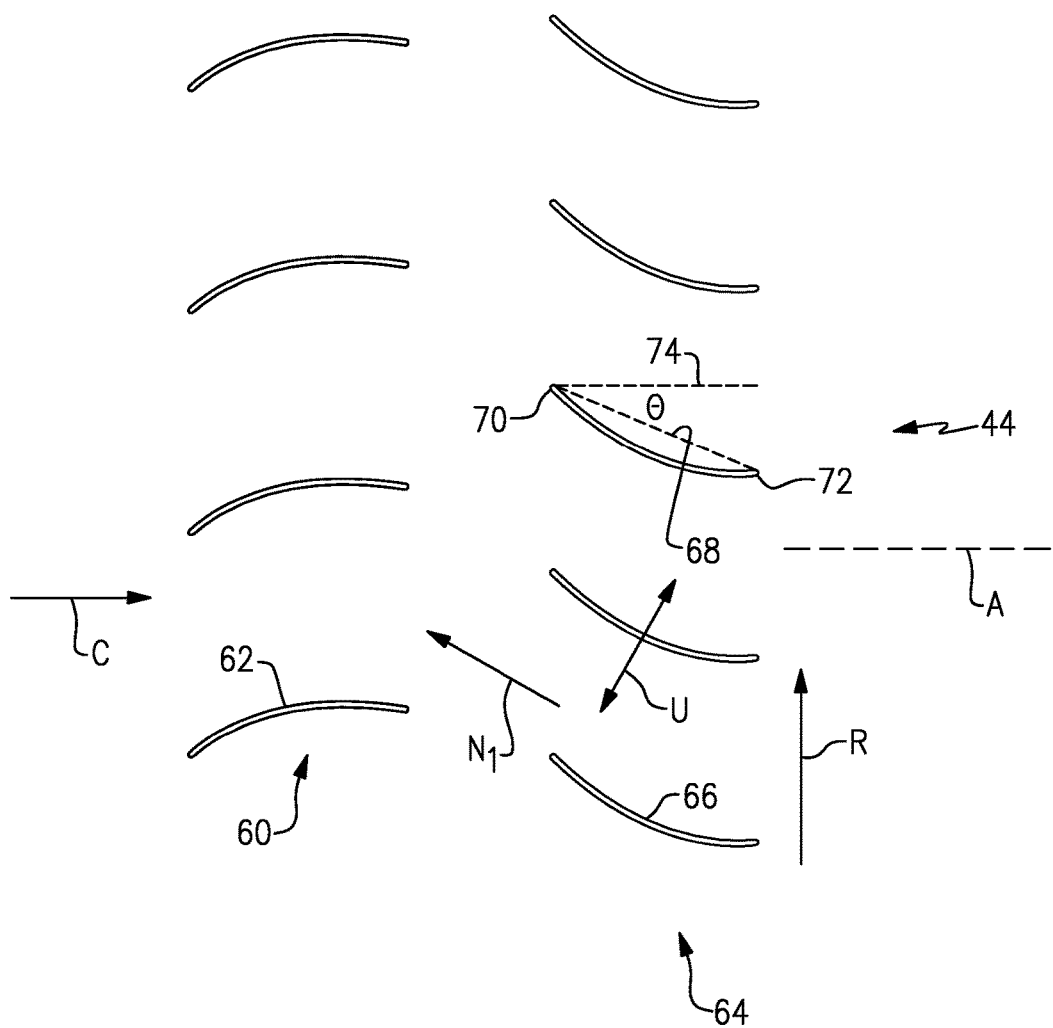
FIG. 2 is a highly schematic view of a section of the gas turbine engine, and in particular illustrates a modal, cuton interaction between adjacent airfoil arrays.

FIG. 2 is a highly schematic view of a portion of a section of the gas turbine engine 20. In this example, the section is the low pressure compressor 44. However, it should be understood that this disclosure may be useful in other sections of the gas turbine engine 20.

In this example, the low pressure compressor 44 includes a plurality of compression stages, each including an array of rotor blades and an array of stator vanes. FIG. 2 shows two adjacent airfoil arrays. A first array 60 includes a first number airfoils 62, which in this example may be stator vanes. A second array 64 of airfoils, which is immediately downstream of the first array 60, includes a second number of airfoils 66. Continuing with the example, the airfoils 66 in the second array 64 are rotor blades configured to rotate about the engine central longitudinal axis A.

The relationship between the number of airfoils in the first array 60 and the number of airfoils in the second array 62 can be controlled to reduce engine noise. To this end, a concept known as "cutoff" has been used in the design of compressors. "Cutoff" designs are typically used in larger engines. In a cutoff configuration, the vane-blade ratio is set such that the blade passing frequency decays in the duct. Another known concept is "high frequency." This solution is typically beneficial in engines with relatively high speed low pressure compressors. Another concept separate from "cutoff" and "high frequency" is called "cuton" (sometimes spelled "cut-on"). In a cuton configuration, the vane-blade ratio is set such that blade passing frequency propagates in the duct.

In this disclosure, the number of airfoils between adjacent arrays is selected such that, while not "cutoff," there is a controlled "modal" interaction between the adjacent arrays. As will be appreciated from the below, the nature of the "modal" interaction reduces sound effectively even though "cutoff" cannot be achieved.

In one example of this disclosure, each successive downstream array of airfoils in the low pressure compressor 44 includes more airfoils than the upstream array. In particular, the number of airfoils in the subsequent, downstream array is a factor of the number of airfoils in the immediately upstream array. In one example, the factor F is the same for each successive array, and is defined by the following equation:

$$F = 1 + \frac{M_{tip}\sin\theta}{1 - M} \quad \text{(Equation 1)}$$

where, for the aircraft's approach power conditions, $M_{tip}$ is a tip rotational Mach number, M is the Mach number into the downstream array from the downstream array's frame of reference, and θ is a stagger angle of the downstream array. The factor F is a vane/blade ratio (V/B as defined below) when the upstream array is a rotor and the downstream array is a stator. The factor F is a blade/vane ratio (B/V as defined below) when the upstream array is a stator and the downstream array is a rotor. F can be defined in general by:

$$F = \frac{kV}{nB}; \text{ for upstream rotor, downstream stator} \quad \text{(Equation 2)}$$

$$F = \frac{kB}{nV}; \text{ for upstream stator, downstream rotor} \quad \text{(Equation 3)}$$

where n is the harmonic of blade passing frequency, B is the number of rotor blades in the blade row interaction, k is the harmonic of vane passing frequency, and V is the number of stator vanes in the stator row interaction. Further, in one example, the stagger angle θ is the incline of a chord 68 between a leading edge 70 and a trailing edge 72 of an airfoil relative to a line 74 parallel to the engine central longitudinal axis A. Alternatively, the stagger angle θ could be the angle of a line tangent to the leading edge.

In this example, the value for n is 1 because the first harmonic of blade passing frequency has the most significant impact on noise reduction. The value for k is also 1, because this is the only cuton mode for the first harmonic of blade passing frequency.

The result of the above Equations 1, 2, and 3 provides maximum noise reduction when in a "cuton" state when the factor F is at least 1.19. In particular, the maximum noise reduction is achieved when the factor F is within a range between 1.19 and 1.55. That is, for a rotor blade passing frequency, the number of airfoils in an array is within a range between 1.19 and 1.55 times the number of airfoils in the immediately upstream array.

The range of the factor F is further defined by the following equations, which are the result of combining Equations 1, 2, and 3.

$$\frac{V}{B} = \frac{n}{k}\left(1 + \frac{M_{tip}\sin\theta}{1 - M}\right); \quad \text{(Equation 4)}$$

for an upstream rotor/downstream stator $$\frac{B}{V} = \frac{k}{n}\left(1 + \frac{M_{tip}\sin\theta}{1 - M}\right); \quad \text{(Equation 5)}$$

for an upstream stator/downstream rotor

In one example, the first array 60 includes 30 stator vanes circumferentially spaced around a disk. In that example, the second array 64 could include between 36 and 47 rotor blades. Continuing with that example, a third array (not pictured) immediately downstream of the second array 64 could include between 43 and 56 stator vanes, and so on.

This could go on for as many interactions as required. In some cases only a portion of the stages within a particular engine section would be defined by this range. For instance, in a geared turbofan, in one example the first compressor stage may be cutoff while the second and third stages would be modal, cuton, and follow the range defined above. It should be noted that the term "stage" as used in this disclosure may refer to a stator-rotor-stator combination.

Figure 3:
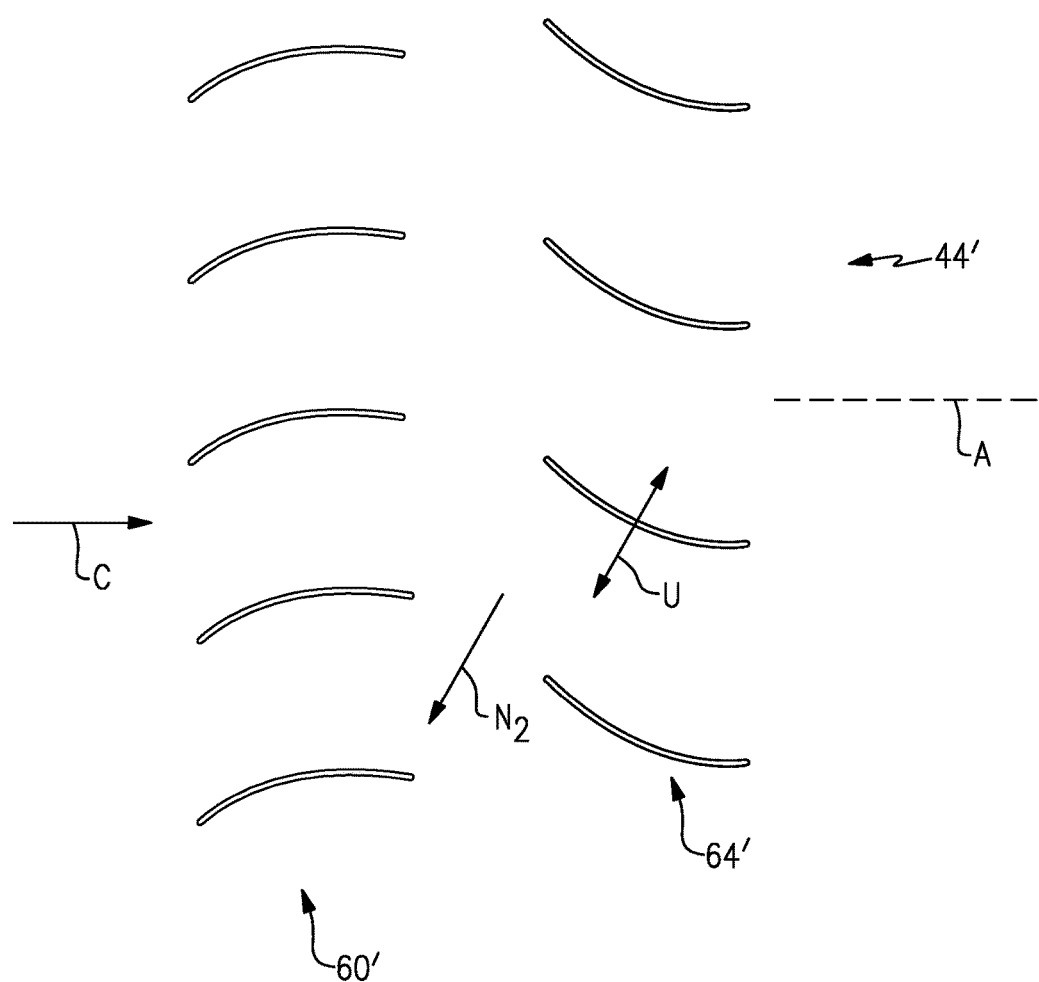
FIG. 3 is another highly schematic view of the section of the gas turbine engine, and in particular illustrates a non-modal, cuton interaction between adjacent airfoil arrays.

The effect of selecting the relative number of airfoils using the factor F is illustrated schematically between FIGS. 2 and 3. With reference to FIG. 2, a modal, cuton arrangement is illustrated. In FIG. 2, the number of airfoils 66 in the second array 64 is dictated by the factor F. As the rotor blades of the second array 64 rotate during operation of the gas turbine engine 20, a pulsing, unsteady pressure is distributed along each airfoil 66. The average direction of this pulsing, unsteady pressure is illustrated at U, and is known as the direction of unsteady lift. The average direction of the unsteady lift U is substantially perpendicular to the direction of the chord 68.

Because of the selected number of airfoils between the first array 60 and the second array 64, noise (i.e., sound) propagates generally in the direction $N_1$. As illustrated, the noise wave propagation direction $N_1$ is substantially perpendicular to the direction of the unsteady lift U. Thus, the pulsating pressure waves of the unsteady lift U do not couple effectively with the noise waves. As a result, the amplitude of the noise waves generated by this interaction is reduced, which in turn reduces noise.

FIG. 3 illustrates a non-modal, cuton arrangement. In FIG. 3, an example low pressure compressor 44' includes a first, upstream array 60' having a number of airfoils that outnumbers those of the second, downstream array 64'. In this example, noise propagates in a direction $N_2$, which is substantially parallel to the direction of unsteady lift U. In this instance, the pressure waves from the unsteady lift U couple better with the noise waves than they do in the FIG. 2 arrangement, and thus there is no significant noise reduction.

Figure 4:
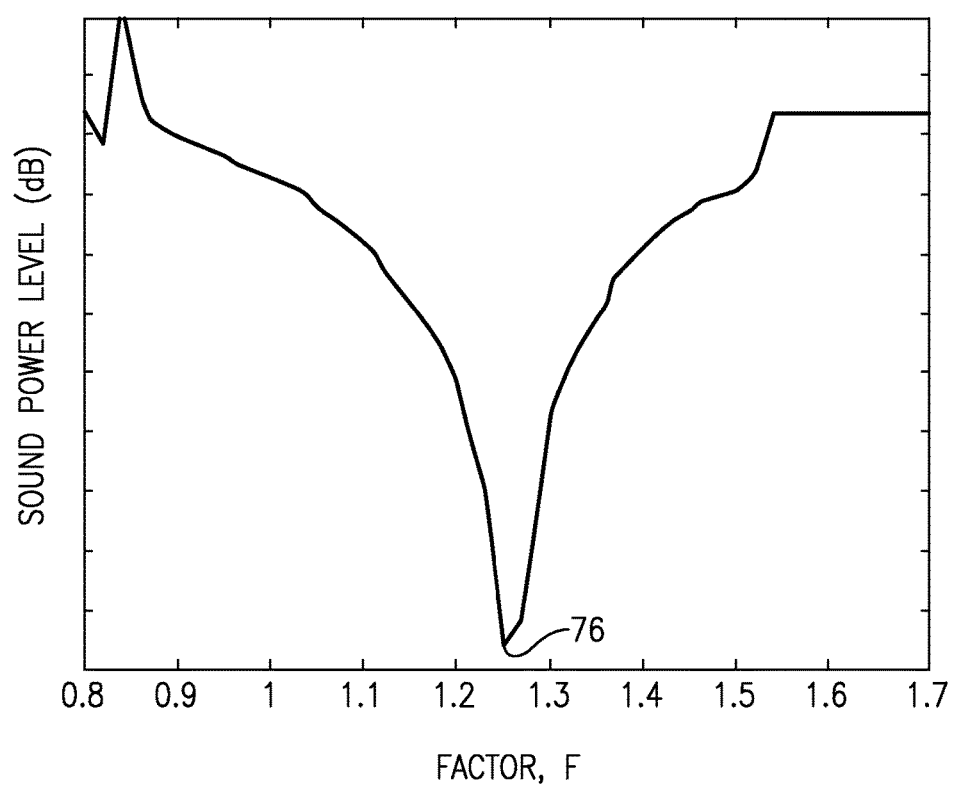
FIG. 4 graphically illustrates the relationship between sound power level and the ratio between the number of airfoils in a downstream array versus the number of airfoils in a upstream array.

FIG. 4 graphically illustrates the relationship between sound power level, in decibels (dB), and the factor F. As mentioned above, when "cutoff" is not possible, maximum noise reduction is achieved when the factor F is within a range between 1.19 and 1.55. As shown above in Equation 1, the factor F is variable based on a number of factors. One particular factor is airfoil shape (including, as examples, characteristics like airfoil camber and airfoil metal angle distribution along the chord), which is captured by stagger angle θ in this example. FIG. 4 shows a plot of sound power level to the factor F for a particular stagger angle θ. In this example, the largest amount of sound reduction is achieved at point 76, which corresponds to a factor F of about 1.25. This factor F is within the range between 1.19 and 1.55 mentioned above.

As mentioned, this disclosure provides a modal, cuton airfoil arrangement, which achieves substantial noise reduction relative to non-modal cuton arrangements. This disclosure has particular benefit in small engines that cannot achieve a cutoff arrangement. As mentioned above, this disclosure has benefits in other engines where certain stages can be "cutoff," while others may benefit from a modal, cuton interaction.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. A section of a gas turbine engine, comprising:
a first array of airfoils, the first array including a first number of airfoils, wherein the first array of airfoils is an array of stator vanes; and
a second array of airfoils downstream of the first array of airfoils, the second array including a second number of airfoils, wherein the second number of airfoils is at least 1.19 times the first number of airfoils thereby providing a modal, cuton interaction between the first and second arrays, wherein the second array of airfoils is an array of rotor blades.

2. The section as recited in claim 1, wherein the second number of airfoils is within a range between 1.19 and 1.55 times the first number of airfoils.

3. The section as recited in claim 2, wherein the range is defined by the following equation $$1 + \frac{M_{tip}\sin\theta}{1-M};$$

and
wherein $M_{tip}$ is a tip rotational Mach number, M is a Mach number into the second array from a frame of reference of the second array, and θ is a stagger angle of the second array.

4. The section as recited in claim 3, wherein the stagger angle is an incline of a chord between a leading edge and a trailing edge of an airfoil relative to a direction parallel to an engine central longitudinal axis.

5. The section as recited in claim 3, wherein the range is further defined by:

$$\frac{n}{k}\left(1 + \frac{M_{tip}\sin\theta}{1-M}\right)$$

when an upstream array is a rotor and a downstream array is a stator;

$$\frac{k}{n}\left(1 + \frac{M_{tip}\sin\theta}{1-M}\right)$$

when the upstream array is a stator and the downstream array is a rotor;
wherein n is a harmonic of blade passing frequency, and k is a harmonic of vane passing frequency.

6. The section as recited in claim 5, wherein n and k are equal to 1.

7. The section as recited in claim 1, wherein the section includes a plurality of arrays of airfoils, and wherein a number of airfoils in each array is at least 1.19 times a number of airfoils in an immediately upstream array.

8. The section as recited in claim 7, wherein the number of airfoils in each array is within a range between 1.19 and 1.55 times the number of airfoils in the immediately upstream array.

9. The section as recited in claim 1, wherein the section is a low pressure compressor.

10. A gas turbine engine, comprising:
a low pressure compressor including a first array of airfoils and a second array of airfoils downstream of the first array, the first array including a first number of airfoils and the second array including a second number of airfoils, wherein the second number of airfoils is at least 1.19 times the first number of airfoils thereby providing a modal, cuton interaction between the first and second arrays, wherein the first array of airfoils is an array of stator vanes and wherein the second array of airfoils is an array of rotor blades.

11. The engine as recited in claim 10, wherein the second number of airfoils is within a range between 1.19 and 1.55 times the first number of airfoils.

12. The engine as recited in claim 11, wherein the range is defined by the following equation $$1 + \frac{M_{tip}\sin\theta}{1-M};$$

and
wherein $M_{tip}$ is a tip rotational Mach number, M is a Mach number into the second array from a frame of reference of the second array, and $\theta$ is a stagger angle of the second array.

13. The engine as recited in claim 12, wherein the stagger angle is an incline of a chord between a leading edge and a trailing edge of an airfoil relative to a direction parallel to an engine central longitudinal axis.

14. The engine as recited in claim 13, wherein the range is further defined by:

$$\frac{n}{k}\left(1 + \frac{M_{tip}\sin\theta}{1-M}\right)$$

when an upstream array is a rotor and a downstream array is a stator;

$$\frac{k}{n}\left(1 + \frac{M_{tip}\sin\theta}{1-M}\right)$$

when the upstream array is a stator and the downstream array is a rotor;
wherein n is a harmonic of blade passing frequency, and k is a harmonic of vane passing frequency.

15. The engine as recited in claim 14, wherein n and k are equal to 1.

16. A method, comprising:
controlling an interaction between a first array of airfoils and a second arrays of airfoils during operation of a gas turbine engine such that the interaction is a modal, cuton interaction by providing a number of airfoils in the second array that is at least 1.19 times the number of airfoils in the first array, wherein the second array of airfoils is downstream of the first array of airfoils, wherein the first array of airfoils is an array of stator vanes and wherein the second array of airfoils is an array of rotor blades.

17. The method as recited in claim 16, wherein the number of airfoils in the second array is within a range between 1.19 and 1.55 times the number of airfoils in the first array.

18. The method as recited in claim 17, wherein the range is defined by the following equation $$1 + \frac{M_{tip}\sin\theta}{1-M};$$

and
wherein $M_{tip}$ is a tip rotational Mach number, M is a Mach number into the second array from a frame of reference of the second array, and $\theta$ is a stagger angle of the second array.

19. The method as recited in claim 18, wherein the range is further defined by:

$$\frac{n}{k}\left(1 + \frac{M_{tip}\sin\theta}{1-M}\right)$$

when an upstream array is a rotor and a downstream array is a stator;

$$\frac{k}{n}\left(1 + \frac{M_{tip}\sin\theta}{1-M}\right)$$

when the upstream array is a stator and the downstream array is a rotor;
wherein n is a harmonic of blade passing frequency, and k is a harmonic of vane passing frequency.

* * * * *